(12) United States Patent
Carolin

(10) Patent No.: US 9,073,601 B2
(45) Date of Patent: Jul. 7, 2015

(54) ELECTRIC MOTOR ASSISTED BICYCLE AND SYSTEMS AND COMPONENTS THEREOF

(71) Applicant: Paradigm, LLC, Kalispell, MT (US)

(72) Inventor: Timothy Carolin, Kalispell, MT (US)

(73) Assignee: Paradigm, LLC, Kalispell, MT (US)

( * ) Notice: Subject to any disclaimer, the term of this patent is extended or adjusted under 35 U.S.C. 154(b) by 0 days.

(21) Appl. No.: 13/906,114

(22) Filed: May 30, 2013

(65) Prior Publication Data

US 2013/0319781 A1    Dec. 5, 2013

Related U.S. Application Data

(60) Provisional application No. 61/653,612, filed on May 31, 2012.

(51) Int. Cl.
*B62M 6/75* (2010.01)
*B62M 13/00* (2010.01)

(52) U.S. Cl.
CPC .................. *B62M 6/75* (2013.01); *B62M 13/00* (2013.01)

(58) Field of Classification Search
CPC ........ B60K 17/043; B60K 17/04; B62M 6/75
USPC ............ 180/65.51, 206.1, 206.8; 301/6.1, 6.5
See application file for complete search history.

(56) References Cited

U.S. PATENT DOCUMENTS 3,732,951 A * 5/1973 Hata et al. .................. 188/24.13
3,841,428 A * 10/1974 Bialek .......................... 180/65.1
3,978,936 A * 9/1976 Schwartz ....................... 180/222
4,062,421 A * 12/1977 Weber .......................... 180/205.1
4,095,663 A * 6/1978 Gaffney ....................... 180/205.1
6,347,682 B1 * 2/2002 Buchner ....................... 180/220
6,677,730 B2    1/2004 Bedini
8,646,850 B2 * 2/2014 Moore ........................... 301/6.1
2004/0209726 A1   10/2004 Hwang (Continued)

FOREIGN PATENT DOCUMENTS

DE         20012009 U1    11/2000
JP         S50150062 U    12/1975

(Continued)

OTHER PUBLICATIONS

International Search Report, mailed Aug. 6, 2013, for PCT/US2013/043437, 4 pages.

*Primary Examiner* — Tony Winner
(74) *Attorney, Agent, or Firm* — Seed IP Law Group PLLC

(57) ABSTRACT

An electric motor assisted bicycle is provided having a fork, a frame, a front wheel, a rear wheel, and pedals drivingly coupled to at least one of the front and rear wheels to enable human powered motion of the bicycle. The bicycle further includes a plurality of bearings uniformly spaced around a perimeter of a rim of one of the front and rear wheels and an electric motor drive system coupled to the bicycle to selectively provide electric motor assisted motion thereof. The electric motor drive system includes an electric motor coupled to the bicycle and a drive cog drivingly coupled to the electric motor, the drive cog positioned to sequentially engage the plurality bearings when driven by the electric motor to power the bicycle in a motor assisted manner. Other bicycle systems and components and related methods are also provided.

23 Claims, 7 Drawing Sheets

(56) References Cited

U.S. PATENT DOCUMENTS

| | | | |
|---|---|---|---|
| 2011/0168471 A1* | 7/2011 | Duignan | 180/205.7 |
| 2013/0264791 A1* | 10/2013 | Handel et al. | 280/250.1 |
| 2013/0342000 A1* | 12/2013 | Yang | 301/6.5 |
| 2014/0167384 A1* | 6/2014 | Chuang | 280/281.1 |

FOREIGN PATENT DOCUMENTS

| | | |
|---|---|---|
| JP | H06321169 A | 11/1994 |
| KR | 20120045651 A | 5/2012 |

* cited by examiner

ELECTRIC MOTOR ASSISTED BICYCLE AND SYSTEMS AND COMPONENTS THEREOF

BACKGROUND

1. Technical Field

The present disclosure is directed to electric motor assisted bicycles and related systems and components thereof.

2. Description of the Related Art

Electric motor assisted bicycles are known and are typically driven from a hub or chain ring within an interior region of the wheel near a rotational axis thereof. Such systems may be effective in propelling a bicycle, but they also suffer from a number of deficiencies including, for example, limitations in generating sufficient torque useful for riding up steep inclines or over rugged terrain. In addition, the systems may be overly complex and may be prone to premature wear, damage or malfunction. Still further, known systems suffer from a variety of inefficiencies that can limit the range and other capabilities of the bicycles.

BRIEF SUMMARY

The electric motor assisted bicycles and components thereof described herein provide for electric motor assisted motion of an otherwise human powered bicycle in a particularly robust and efficient form factor. Embodiments of the electric motor assisted bicycles are particularly well suited for transitioning between a human powered mode in which a user can pedal the bicycle in a conventional manner and an electric motor assisted mode in which the bicycle is propelled via an electric motor coupled to a rim of a wheel of the bicycle. More particularly, the electric motor may be controlled to selectively rotate a drive cog which is positioned to drivingly engage a plurality of bearings uniformly spaced around a perimeter of the rim to drive the wheel and propel the bicycle. In some embodiments, the electric motor is coupled to the drive cog via a clutch, such as, for example, a needle bearing clutch or an electromagnetic clutch, to selectively transmit power from the electric motor to the drive cog. In this manner, the drive cog can freewheel and enable pedaling of the bicycle in a conventional manner without requiring disengagement of the drive cog from the bearings that are spaced around the perimeter of the rim.

According to one particular embodiment, an electric motor assisted bicycle may be summarized as including a bicycle structure having a fork, a frame, a front wheel, a rear wheel, and pedals drivingly coupled to at least one of the front and rear wheels to enable human powered motion of the bicycle; a plurality of bearings uniformly spaced around a perimeter of a rim of one of the front and rear wheels, each of the plurality of bearings including a cylindrical engagement profile; and an electric motor drive system coupled to the bicycle to selectively provide electric motor assisted motion thereof, the electric motor drive system including an electric motor coupled to the bicycle and a drive cog drivingly coupled to the electric motor, the drive cog positioned to sequentially engage the plurality bearings when driven by the electric motor to power the bicycle in a motor assisted manner.

DETAILED DESCRIPTION

In the following description, certain specific details are set forth in order to provide a thorough understanding of various disclosed embodiments. However, one skilled in the relevant art will recognize that embodiments may be practiced without one or more of these specific details. In other instances, well-known structures and devices associated with bicycles, bicycle drive systems and components for bicycles may not be shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

Figure 1:
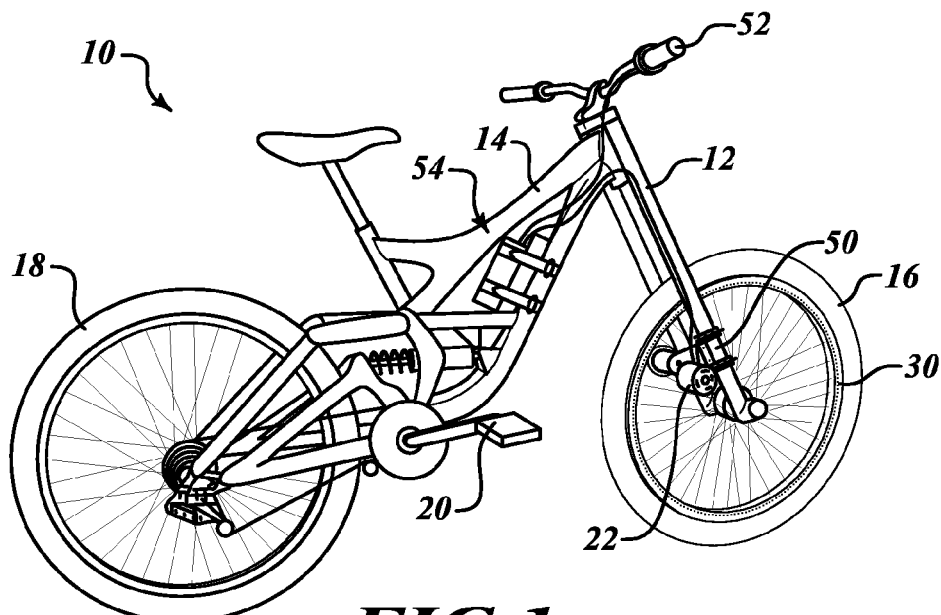
FIG. 1 is a perspective view of an electric motor assisted bicycle, according to one embodiment, in which an electric motor is coupled to a fork of the bicycle and positioned to support a drive cog in engagement with a plurality of bearings uniformly spaced around the front wheel.
Figure 2:
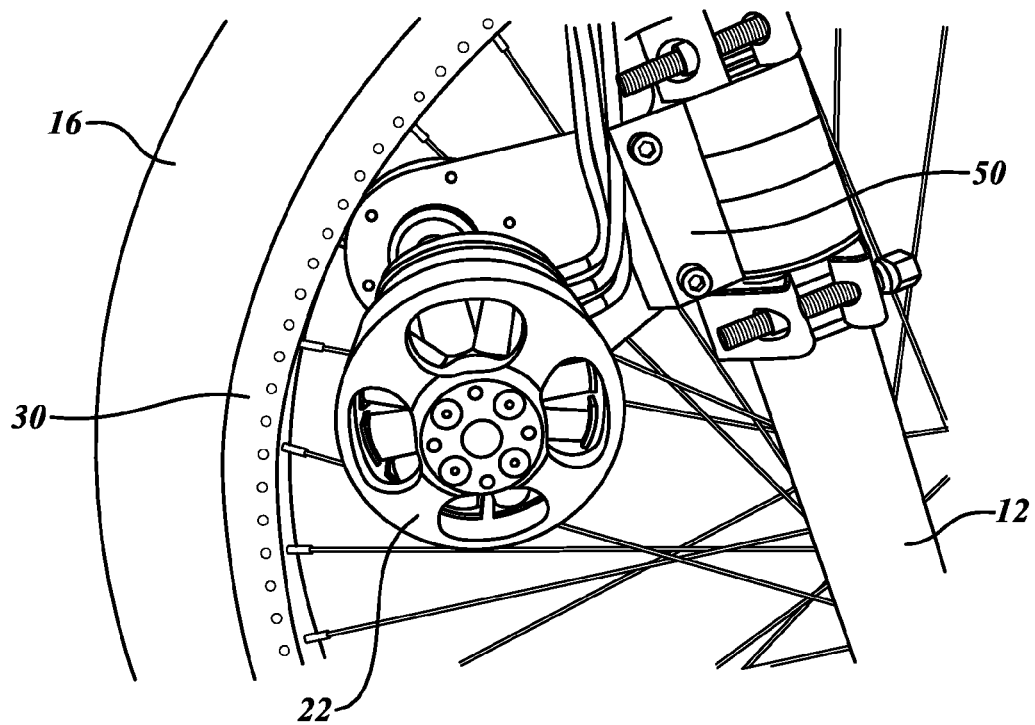
FIG. 2 is an enlarged view of a portion of the bicycle of FIG. 1 showing the electric motor mounted to the fork in further detail.
Figure 3:
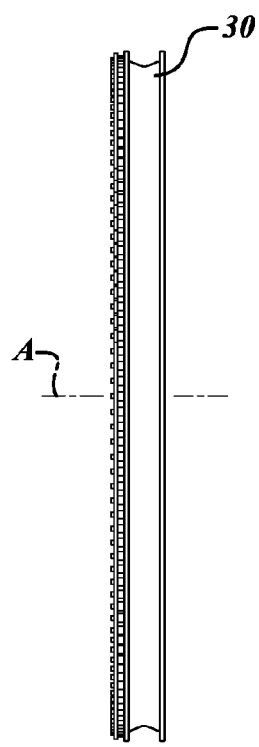
FIG. 3 is a front elevational view of a rim of an electric motor assisted bicycle, according to one embodiment.
Figure 4:
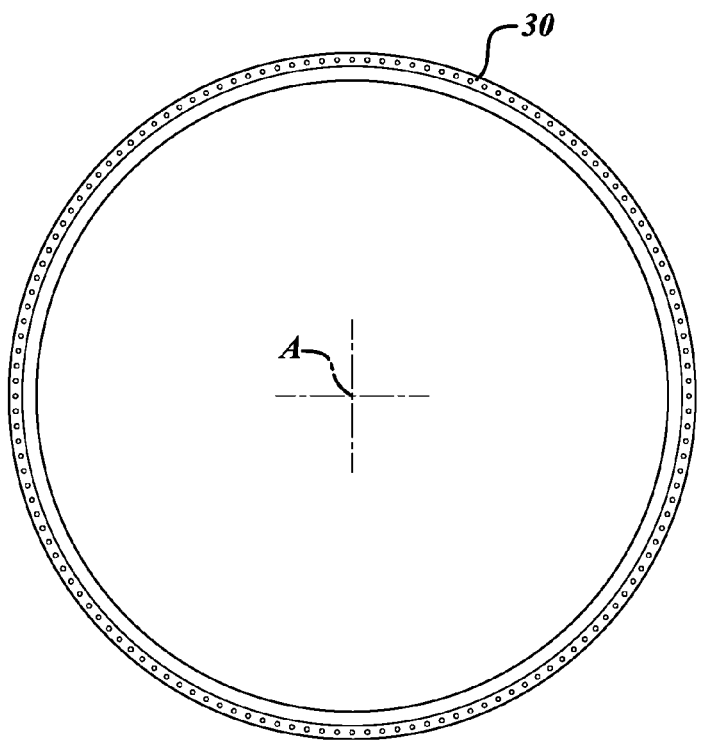
FIG. 4 is side elevational view of the rim of FIG. 3.
Figure 5:
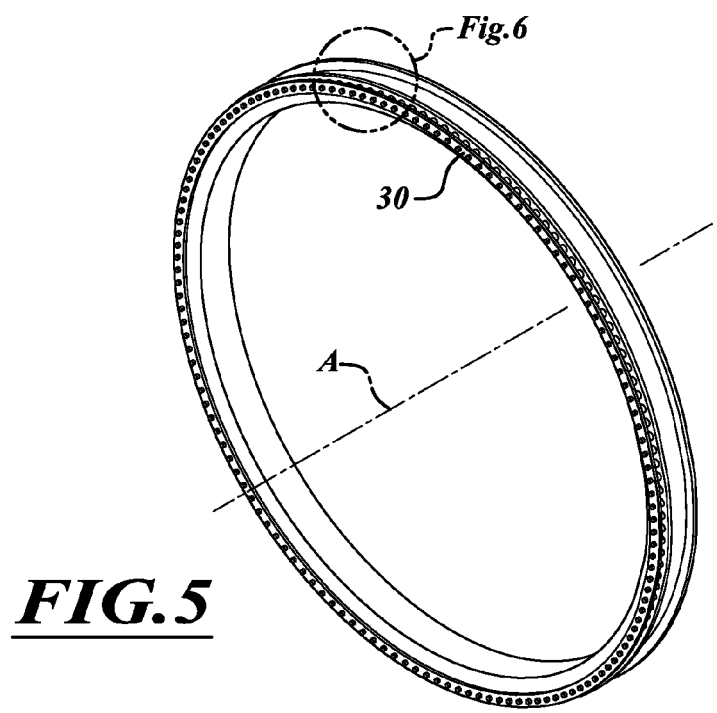
FIG. 5 is an isometric view of the rim of FIG. 3.
Figure 6:
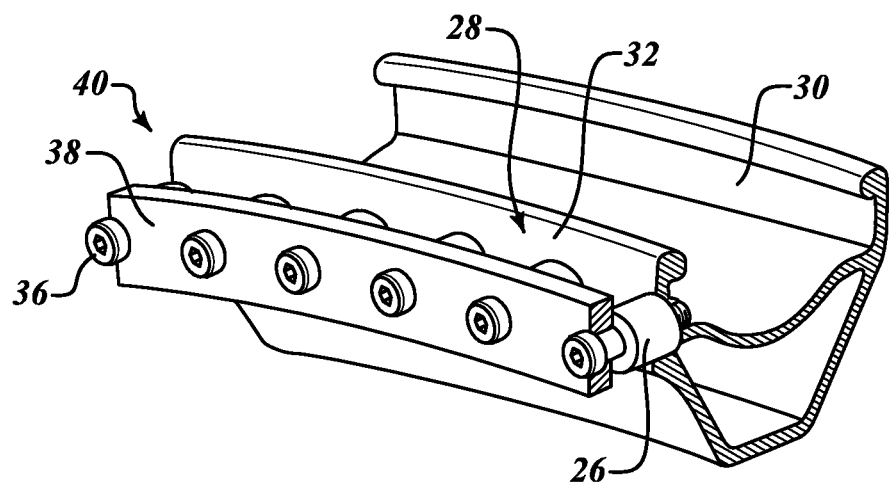
FIG. 6 is an enlarged isometric view of a portion of the rim taken from FIG. 5.
Figure 7:
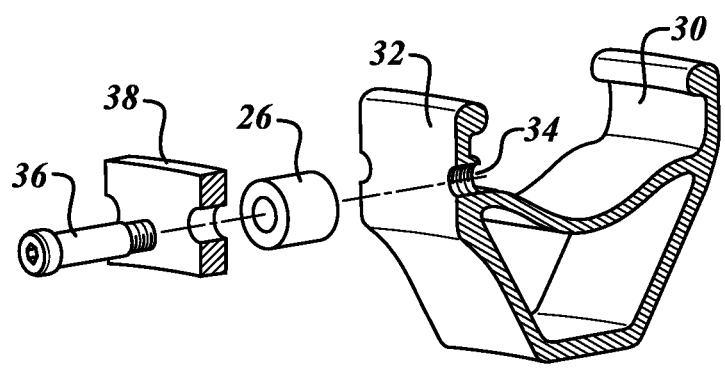
FIG. 7 is an enlarged exploded isometric view of a portion of the rim.

FIG. 1 shows an electric motor assisted bicycle 10, according to one embodiment, having a fork 12, a frame 14, a front wheel 16, a rear wheel 18, and pedals 20 drivingly coupled to the rear wheel 18 to enable human powered motion of the bicycle 10 in a conventional manner. Other well known bicycle structures (e.g., handle bars, seat, bike chain, sprockets, etc.) are not described in detail to avoid unnecessarily obscuring descriptions of the embodiments.

Figure 8:
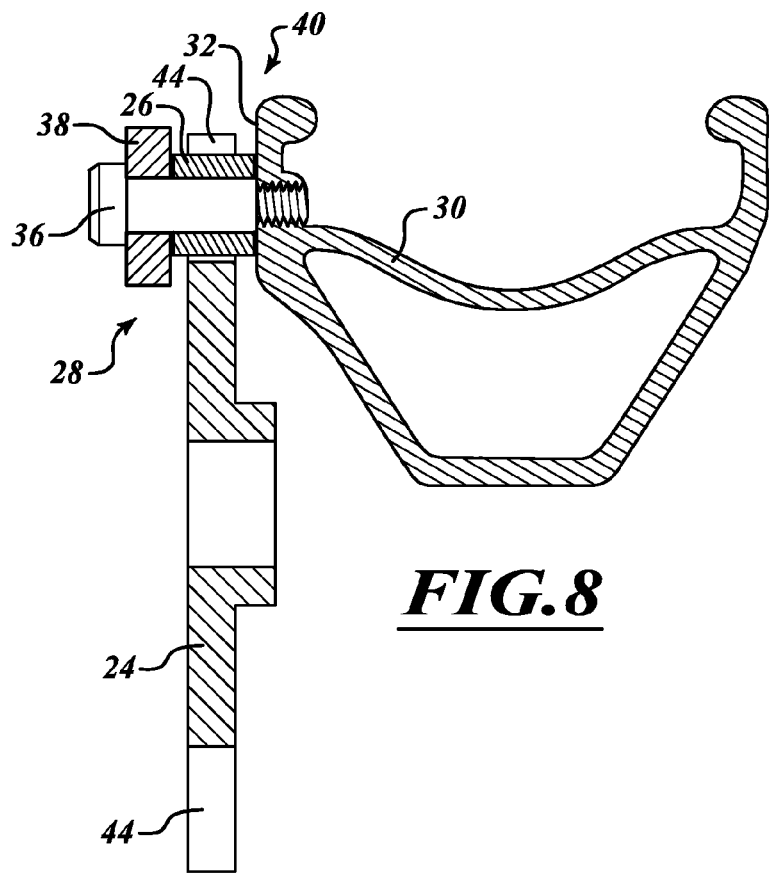
FIG. 8 is a cross-sectional view of the rim of FIG. 3 with a drive cog engaged therewith.
Figure 9:
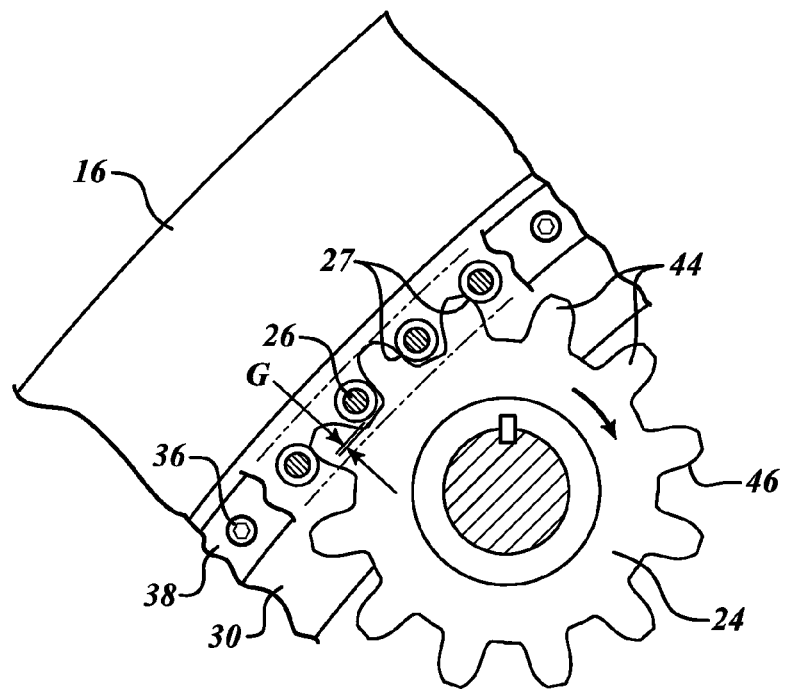
FIG. 9 is a side elevational detail view of the rim of FIG. 3 with a tire coupled thereto and a drive cog engaged therewith.

The bicycle 10 further includes an electric motor 22 coupled to the fork 12 of the bicycle 10 and positioned to support a drive cog 24 in engagement with a plurality of bearings 26 uniformly spaced around a perimeter 28 of a rim 30 of the front wheel 16, as shown best in FIGS. 8 and 9. The electric motor 22 may be an outrunner brushless DC motor, such as, for example, an AXi™ model 5345/18 HD outrunner motor or other electric motor with similar functionality. In some embodiments, the motor 22 may include magnetic bearings instead of rolling element bearings for increased efficiency. Still further, in some embodiments, the motor 22 may be configured to be driven via a pulsed signal in accordance with the teachings of U.S. Pat. No. 6,677,730 to Bedini, which is incorporated herein by reference in its entirety for all purposes.

The rim 30 may be an extruded aluminum rim or other metallic or composite rim and may have a variety of cross-sectional profiles, including various conventional rim profiles. Accordingly, aspects of the electric motor assisted bicycles 10, drive systems and other components thereof which are described herein are not limited to the specific rim structures shown in the Figures, but may include or operate in conjunction with a wide variety of bicycle rim types or styles, including custom rims.

With reference to FIGS. 3 through 9, the plurality of bearings 26 uniformly spaced around the perimeter 28 of the rim 30 may be in the form of roller bearings that are secured next to a sidewall 32 of the rim 30 by a plurality of corresponding fasteners 36, such as, for example, shoulder bolts or other fasteners. The sidewall 32 of the rim 30 may include a plurality of threaded apertures 34 (FIG. 7) to receive said fasteners 36. In this manner, the bearings 26 may be removably attachable to the rim 30 to facilitate maintenance or replacement of the same. Alternatively, the bearings 26 may be integrally formed in the rim 30 or permanently affixed to the rim 30. In some embodiments, the bearings 26 may be roller bearings having a length of about ¼ inch and a diameter of about ¼ inch and be spaced to have a pitch of about ½ inch, thereby defining a space between the bearings 26 to receive a tooth 44 of the drive cog 24 having a thickness at the region of engagement of about ¼ inch. The drive cog 24 and bearings 26 may be made of various metals, plastics, composites or other materials and may be made of similar or dissimilar materials.

Figure 10:
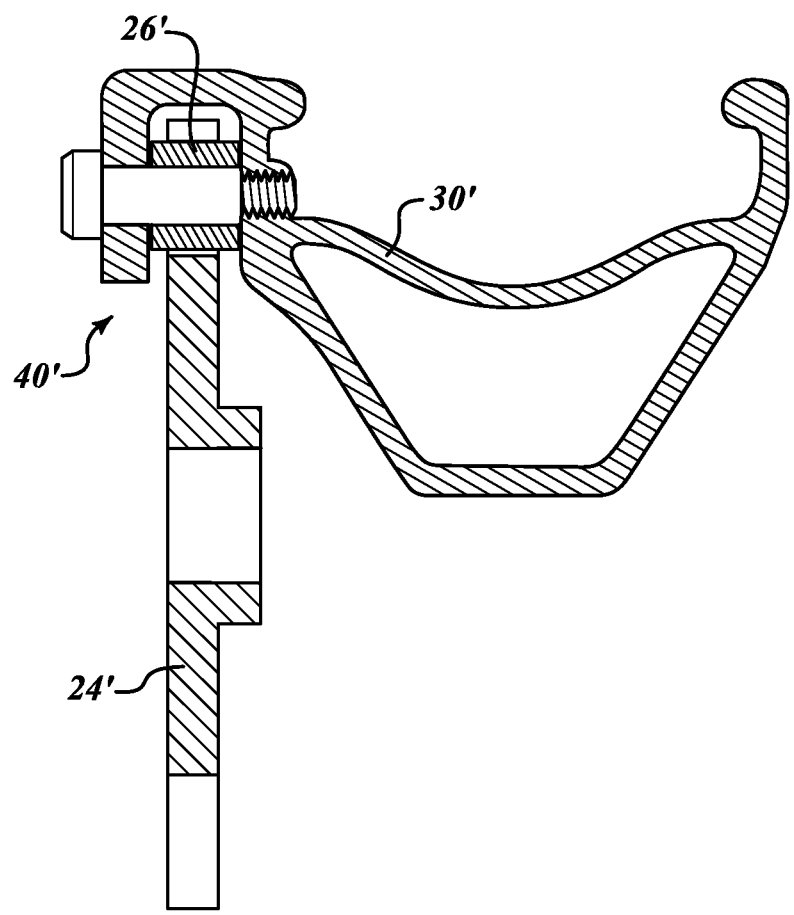
FIG. 10 is a cross-sectional view of a rim of an electric motor assisted bicycle, according to another embodiment, with a drive cog engaged therewith.
Figure 11:
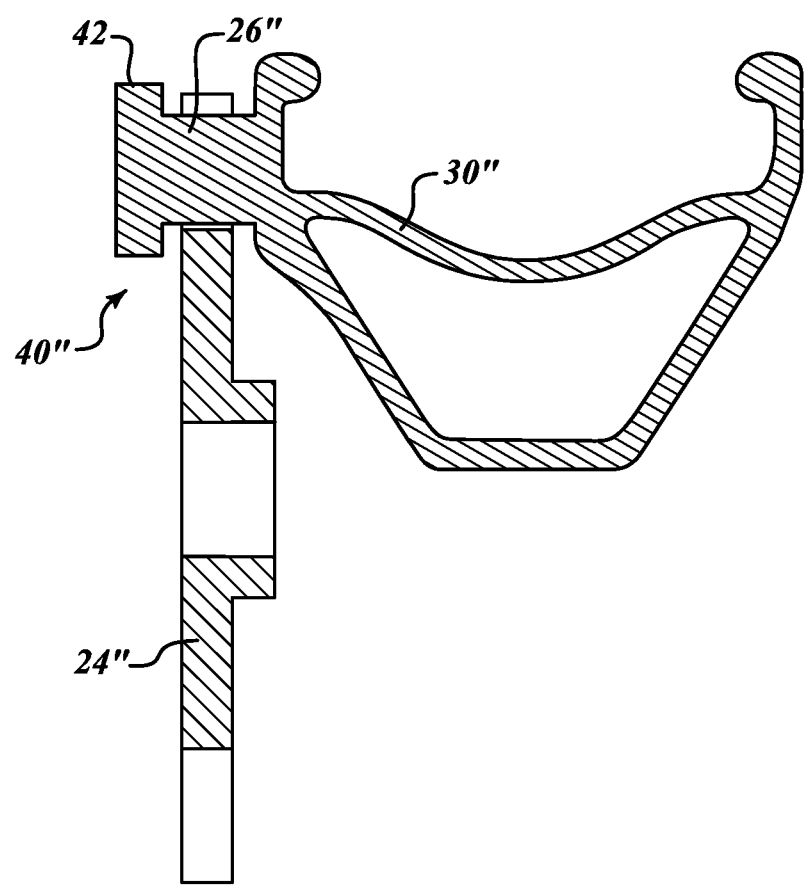
FIG. 11 is a cross-sectional view of a rim of an electric motor assisted bicycle, according to yet another embodiment, with a drive cog engaged therewith.

According to the illustrated embodiment of FIGS. 3 through 9, the rim 30 (or rim assembly) may include a bearing ring 38 that is removably attachable to the rim 30 to secure the plurality of bearings 26 therebetween in a channel 40 or band arrangement. In some instances, the bearing ring 38 may be attached to the rim 30 by the same plurality of fasteners 36 that attach the bearings 26 to the rim 30. In one embodiment, the bearing ring 38 may be a fabricated (cast, machined, etc.) aluminum disk that is attachable to the rim 30 with the bearings 26 therebetween. The disk may be about ⅛ inch thick and about ⅜ inch wide. In other embodiments, the bearing ring 38 may be omitted and a channel 40' may be integrally formed with the rim 30' to receive and support the plurality of bearings 26' therein, as shown, for example, in FIG. 10. The channel 40' opens toward a central rotational axis A (FIGS. 3-5) and may include apertures, such as, for example, slots or windows, on a backside thereof to enable dirt, mud and other matter to pass through the channel 40' more easily during operation. In still other embodiments, bearings 26" may be formed with the rim 30" and a flange 42 to form a channel 40" having integral bearings 26", as shown, for example, in FIG. 11. In still yet other embodiments, bearings may be cantilevered from the rim 30, and may comprise, for example, stationary pins projecting from a side wall of the rim 30. Irrespective of the particular mounting arrangement, embodiments of the rims 30, 30', 30" described herein provide a channel or band of uniformly spaced bearing elements 26, 26', 26" that are configured to be engaged and driven by a drive cog 26, 26', 26" for electric motor assisted propulsion of the host bicycle 10.

With reference again to the example embodiment of FIGS. 3 through 9, each of the plurality of bearings 26 includes a cylindrical engagement profile 27 that is drivingly contacted by the drive cog 24 during electric motor assisted operation. In some embodiments, the bearings 26 may have an entirely cylindrical profile as shown best in FIGS. 6 through 9, or in other embodiments, only a portion each bearing 26 that faces toward the central axis A and which is positioned to be drivingly engaged by the drive cog 24 may include a cylindrical profile. The bearings 26 may be roller bearings and may be configured to rotate about their own axis of rotation. In other embodiments, the bearings 26 may be fixedly attached to the rim 30 or integrally attached to the rim 30 such that the bearings 26 remain static relative to the rim 30.

The drive cog 24 includes a plurality of teeth 44 each having a convex engagement profile 46 to contact the cylindrical engagement profile 27 of each bearing 26 during electric motor assisted operation of the bicycle 10. The interaction of the convex engagement profile 46 of each tooth 44 with the cylindrical engagement profile 27 of each bearing 26 is particularly well adapted for off-road biking conditions and allows for particularly smooth acceleration and deceleration without significant risk of binding, stalling and/or stripping of the teeth 44. In addition, the bearing 26 and drive cog 24 arrangement is particularly well suited for enabling dirt, mud and other matter to pass through the channel or band of bearings 26 to minimize clogging or fouling of the drive system. In addition, a clearance gap G is preferably maintained between the cylindrical engagement profile 27 of a given bearing 26 and the valley between the teeth 44 of the drive cog 24 positioned on opposing sides of the bearing 26, as shown, for example, in FIG. 9. In some embodiments, the gap G may be between about 1/16 inch and about 3/16 inch. The teeth 44 of the drive cog 26 may include rounded peaks and valleys to engage the bearings 26 and propel the rim 30. In some embodiments, the teeth 44 may be about ¼ inch wide at the region of contact. The convex engagement profile 46 of each tooth 44 may have a different profile than the engagement profile 27 of each bearing 26 at the region of contact. For example, the engagement profile 27 of each bearing 26 may be cylindrical and the engagement profile 46 each tooth may be non-cylindrical, yet convex. The dissimilar profiles enhance operation of the drive system and are believed to significantly reduce or eliminate the risk of binding, stalling and/or stripping that might otherwise occur during particularly rugged rides.

According to the example embodiment of FIGS. 3 through 9, the drive cog 24 includes twelve teeth 44 uniformly spaced around a perimeter thereof; however, in other embodiments the drive cog 24 may include more or fewer teeth 44. For example, in some embodiments, the drive cog 24 may include eight to sixteen teeth 44. In one embodiment that is particularly well adapted for climbing, the drive cog 34 includes nine teeth 44. In one embodiment that is particularly well adapted for higher speeds, the drive cog 34 includes sixteen teeth 44. According to the illustrated embodiment of FIGS. 3 through 9, the rim 30 includes one hundred and forty bearings 26 uniformly spaced around a perimeter thereof; however, in other embodiments the rim 30 may include more or fewer bearings 26. For example, in some embodiments, the number of bearings 26 may amount to one hundred and twenty to one hundred and sixty bearings 26. Accordingly, in some embodiments, a ratio of the number of bearings 26 of the rim 30 to the number of teeth 44 of the drive cog 24 may be between about 10:1 and about 20:1.

The arrangement of the channel 40 of bearings 26 at the outer perimeter region of the wheel 16 of the bicycle 10 advantageously develops more torque than a comparative hub drive motor arrangement. In some embodiments, the electric motor 22 may connect by a mount 50 (FIG. 1) to the front fork 12 and drive the front wheel 16 (by way of bearings 26) from an internal circumference thereof. The drive system preferably utilizes a combination of parts to create a system of stacked efficiencies to achieve a light weight form factor with enhanced range and other enhanced performance capabilities. These parts may include, for example, an electric motor 22 in the form of an outrunner brushless DC electric motor and an electrical storage element (not shown) in the form of an ultracapacitor, which operate with other system components to efficiently drive the channel of bearings 26 by way of the drive cog 24. An outrunner motor spins its outer shell around its windings and can provide relatively more torque than its inrunner counterpart. This motion of the outrunner motor mimics the way the wheel 16 is driven and is believed to create a particularly efficient drive arrangement with respect to range and performance of the bicycle 10. By driving from the outer perimeter region of the wheel 16 an immense increase of torque may be delivered to the trail or road. Further, this arrangement enables the electric motor 22 to operate within a more efficient range. Accordingly, the bicycle 10 is more effective for hill climbing than other convention electric motor assisted bicycles—consuming relatively less power when operated on similar terrain.

The channel 40 of bearings 26, the electric motor 22 and the drive cog 24 are components of an electric motor drive system. The electric motor drive system may further include a throttle device 52 (FIG. 1), such as, for example, an electric twist grip throttle, thumb lever or other device, to selectively control a speed of the electric motor 22 during motor assisted operation of the bicycle 10. For this purpose, the throttle device 52 may communicate with a control unit 54 (FIG. 1) which includes electronic speed control circuitry to control a speed of the electric motor during motor assisted operation. The control unit 54 may selectively control the supply of power to and from an electrical storage element in the form of a battery or capacitor. In some embodiments, the throttle device 52 may be a Magura™ brand twist throttle with built in potentiometer.

The control unit 54 may further include and/or communicate with a regenerative recharging circuit that enables regenerative braking and/or regenerative pedaling functionality to recharge the electrical storage element while operating the bicycle 10. For example, regenerative braking functionality may be provided to effectively convert the electric motor 22 into a generator when braking to recharge the storage element. The storage element may be, for example, a battery or a capacitor, including an ultracapacitor. As another example, regenerative pedaling functionality may be provided in addition to or in lieu of regenerative braking functionality to effectively convert the electric motor 22 into a generator when pedaling the bicycle 10 to recharge the storage element. In this manner, the bicycle can be effectively recharged by a rider while keeping the bicycle's original freewheeling and sprocket, chain drive intact. Still further, regenerative controlled downshifting functionality may be provided.

In some embodiments, the regenerative recharging circuit may include a high charge, high discharge ultracapacitor as an electrical storage element. Regenerative controlled downshifting and/or regenerative braking may be provided to control descents while recharging the ultracapacitor. In this manner, the drive system may act as the front brake to slow and stop the bicycle. Much of the forward momentum in the front braking may be converted into stored energy in the ultracapacitor by the regeneration circuit. Again, the additional efficiencies of such systems may stack or compound to provide a particularly efficient drive system resulting in enhanced range and performance. In some embodiments, the regenerative braking functionality may be controlled by a micro switch in a break lever coupled to the handlebars. In some embodiments, a switch, such as a manual toggle switch, may also be provided to enable a regenerative pedaling mode. Regeneration can be accomplished by providing, among other things, a clutch, such as an electromagnetic spring clutch, between the electric motor 22 and the drive cog 26. When energized, the clutch couples a drive shaft of the electric motor 22 to the drive cog 26 to rotate in unison therewith. Conversely, when de-energized, the drive cog 26 may freewheel and enable the bicycle 10 to be operated in a conventional human-pedaled manner. The clutch may be an electromagnetic clutch, such as, for example the M-Series Tiny Clutch™ available from Helander Products, Inc., or other clutch having similar functionality. In some embodiments, a needle bearing clutch or other similar clutch device may be used between the electric motor 22 and drive cog 26.

It is appreciated that in some embodiments an electric motor assisted bicycle 10 may include a rim 30 with integrated roller bearings 26 around an outer perimeter region thereof which is driven by a toothed drive cog 24 powered by an outrunner electric motor 22 via the intermediary of an electromagnetic spring clutch. Energy for driving the electric motor 22 may be supplied by an ultracapacitor storage element and controlled by a throttle 52 and control unit 54 which includes electronic speed control and regenerative circuitry. A bicycle 10 configured in this manner is particularly well adapted to enable electric motor assisted motion of the bicycle 10 in a robust and efficient form factor.

It is also appreciated that components of the bicycles 10 described herein may be assembled and/or packaged together in one or more assemblies or sub-systems. For example, the electric motor 22, the drive cog 24 and the intermediate clutch may be fixed to the front fork 12 by a mount 50 to form a fork assembly. The mount 50 may be integrated into the front fork with two bolts much like a conventional disk brake mount. In some instances, the fork 12 may include an integral mounting arrangement for receiving the electric motor 22 and supporting the motor 22 such that the drive cog 26 engages an outer perimeter region of the front wheel 16 during operation. In other instances the mount 50 can be removably attachable to the bicycle 10 with various quick release devices, such as, for example, a dovetail interface with ball detents. In this manner, the electric motor 22, the drive cog 24 and the intermediate clutch may be conveniently removed from the bicycle 10 to enable riding without the added weight of such components. The motor 22 and other components of the drive system may also include quick disconnect electrical connections for this purpose.

Figure 12:
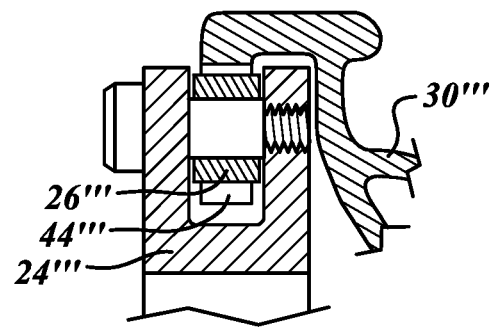
FIG. 12 is a cross-sectional view of a rim of an electric motor assisted bicycle, according to still yet another embodiment, with a drive cog engaged therewith.
Figure 13:
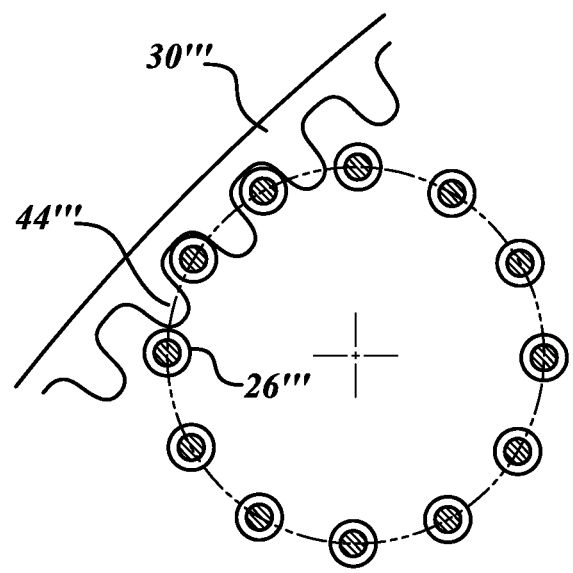
FIG. 13 a side elevational detail view of the rim of FIG. 12 with a portion of the drive cog engaged therewith.

Furthermore, although the example embodiment shown in FIGS. 1 through 9 shows an electric motor assisted bicycle 10 that is front-wheel drive, it is appreciated that in other embodiments, the drive system (i.e., motor 22, drive cog 24, etc.) may be provided at the rear wheel 18 or at both wheels. In addition, although the example embodiment shown in FIGS. 1 through 9 shows an electric motor assisted bicycle 10 with a toothed drive cog 24 positioned to engage a channel 40 or band of bearings 26, in other embodiments, the drive cog 24 may include a plurality of roller bearings (instead of teeth 44) that engage teeth formed or otherwise provided around a perimeter of the rim 30 which have a profile similar to the teeth 44 of the drive cog 24 illustrated best in FIG. 9. For example, FIGS. 12 and 13 show one embodiment of a rim 30''' having integral teeth 44''' that include a convex contact surface for engagement by roller bearings 26''' supported by a drive cog 24'''. The drive cog 24''' may include, for example, an H-shaped cross-sectional profile with a plurality of roller bearings 26''' supported between opposing sidewalls of the drive cog 24 around an outer periphery thereof, as shown in FIGS. 12 and 13.

Moreover, aspects and features of the various embodiments described above can be combined to provide further embodiments. In addition, U.S. Provisional Patent Application No. 61/653,612, filed May 31, 2012, is incorporated by reference for all purposes and aspects of the invention can be modified, if necessary, to employ features, systems, and concepts disclosed in the application to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An electric motor assisted bicycle, the bicycle comprising:
   a bicycle structure having a fork, a frame, a front wheel, a rear wheel, and pedals drivingly coupled to at least one of the front and rear wheels to enable human powered motion of the bicycle;
   a plurality of bearings uniformly spaced around a perimeter of a rim of one of the front and rear wheels, each of the plurality of bearings including a cylindrical engagement profile;
   a bearing ring, the bearing ring removably attachable to the rim to secure the plurality of bearings therebetween; and
   an electric motor drive system coupled to the bicycle to selectively provide electric motor assisted motion thereof, the electric motor drive system including an electric motor coupled to the bicycle and a drive cog drivingly coupled to the electric motor, the drive cog positioned to sequentially engage the plurality of bearings when driven by the electric motor to power the bicycle in a motor assisted manner.

2. The bicycle of claim 1 wherein the plurality of bearings are uniformly spaced around the perimeter of the rim of the front wheel and the electric motor is coupled to the fork of the bicycle to position the drive cog near the perimeter of the rim of the front wheel.

3. The bicycle of claim 1 wherein the plurality of bearings are uniformly spaced around the perimeter of the rim of the rear wheel and the electric motor is coupled to a rear portion of the frame of the bicycle to position the drive cog near the perimeter of the rim of the rear wheel.

4. The bicycle of claim 1 wherein the plurality of bearings are roller bearings and are positioned adjacent a sidewall of the rim.

5. The bicycle of claim 1 wherein the electric motor is an outrunner brushless DC motor.

6. The bicycle of claim 1 wherein the plurality of bearings are individually removably attachable to the rim.

7. The bicycle of claim 1 wherein the plurality of bearings physically abut a sidewall of the rim.

8. The bicycle of claim 1 wherein the bicycle includes a brake lever and the electric motor drive system further includes a switch that is triggered by actuation of the break lever to generate a signal to activate a regenerative braking mode.

9. The bicycle of claim 1 wherein the electric motor drive system further includes a switch that generates a signal to activate a regenerative pedaling mode when actuated.

10. The bicycle of claim 1 wherein the electric motor drive system further includes an electric twist grip throttle to selectively control a speed of the electric motor during motor assisted operation of the bicycle.

11. The bicycle of claim 1 wherein the drive cog includes a plurality of teeth each having a convex engagement profile to contact the cylindrical engagement profile of each bearing during electric motor assisted operation of the bicycle.

12. The bicycle of claim 1 wherein the drive cog includes eight to sixteen teeth and the plurality of bearings amount to one hundred and twenty to one hundred and sixty bearings.

13. The bicycle of claim 1 wherein the drive cog includes a plurality of teeth and wherein a ratio of the plurality of bearings to teeth is between about 10:1 and about 20:1.

14. The bicycle of claim 1 wherein the drive cog includes a plurality of teeth and corresponding valleys therebetween, and wherein a clearance gap is maintained between the cylindrical engagement profile of a given bearing and the valleys between the teeth of the drive cog engaging the given bearing during operation.

15. The bicycle of claim 1 wherein the electric motor drive system further includes an electromagnetic clutch positioned between the electric motor and the drive cog.

16. The bicycle of claim 1 wherein the electric motor drive system further includes an ultracapacitor storage element to temporarily store electrical energy and to selectively supply the electrical energy to the electric motor to rotate the drive cog and propel the bicycle.

17. An electric motor assisted bicycle, the bicycle comprising:
   a bicycle structure having a fork, a frame, a front wheel, a rear wheel, and pedals drivingly coupled to at least one of the front and rear wheels to enable human powered motion of the bicycle;
   a plurality of bearings uniformly spaced around a perimeter of a rim of one of the front and rear wheels, each of the plurality of bearings including a cylindrical engagement profile, and the rim including a channel integrally formed therein and the plurality of bearings being positioned within the channel; and
   an electric motor drive system coupled to the bicycle to selectively provide electric motor assisted motion thereof, the electric motor drive system including an electric motor coupled to the bicycle and a drive cog drivingly coupled to the electric motor, the drive cog positioned to sequentially engage the plurality of bearings when driven by the electric motor to power the bicycle in a motor assisted manner.

18. An electric motor assisted bicycle, the bicycle comprising:
   a bicycle structure having a fork, a frame, a front wheel, a rear wheel, and pedals drivingly coupled to at least one of the front and rear wheels to enable human powered motion of the bicycle;

a plurality of bearings uniformly spaced around a perimeter of a rim of one of the front and rear wheels, each of the plurality of bearings including a cylindrical engagement profile, and the rim including a channel integrally formed therein and the plurality of bearings being integrally formed within the channel; and an electric motor drive system coupled to the bicycle to selectively provide electric motor assisted motion thereof, the electric motor drive system including an electric motor coupled to the bicycle and a drive cog drivingly coupled to the electric motor, the drive cog positioned to sequentially engage the plurality of bearings when driven by the electric motor to power the bicycle in a motor assisted manner.

19. The bicycle of claim 18 wherein the plurality of bearings are integrally formed in the rim.

20. A bicycle rim of an electric motor assisted bicycle, the bicycle rim comprising:

a ring-shaped body in which a cross-section of the body includes opposing sidewalls;

a plurality of threaded apertures formed in at least one of the opposing sidewalls of the ring-shaped body, the plurality of threaded apertures uniformly spaced around a perimeter of the ring-shaped body;

roller bearing elements removably attached to the plurality of threaded apertures in a pattern adapted to drivingly receive teeth of a drive cog; and a bearing ring, the bearing ring removably attachable to the ring-shaped body to secure the plurality of roller bearing elements therebetween.

21. An electric motor drive system for a bicycle, the drive system comprising:

a bicycle rim;

a plurality of bearings uniformly spaced around a perimeter of the rim, each of the plurality of bearings including a cylindrical engagement profile;

a bearing ring, the bearing ring removably attachable to the rim to secure the plurality of bearings therebetween;

an electric motor; and a drive cog drivingly coupled to the electric motor, the drive cog positioned to sequentially engage the plurality bearings when driven by the electric motor to drive the rim about a central axis of rotation.

22. The electric motor drive system of claim 21, further comprising:

an electromagnetic clutch positioned between the electric motor and the drive cog.

23. The electric motor drive system of claim 21, further comprising:

an ultracapacitor storage element to temporarily store electrical energy and to selectively supply the electrical energy to the electric motor to rotate the drive cog and propel the bicycle.

* * * * *